No. 872,635. PATENTED DEC. 3, 1907.
H. J. AVERBECK.
FEED REGULATOR.
APPLICATION FILED APR. 2, 1906.

3 SHEETS—SHEET 1.

Witnesses
C. W. Miles
N. McCormack

Inventor
Henry J. Averbeck
By Walter F. Murray
Attorney

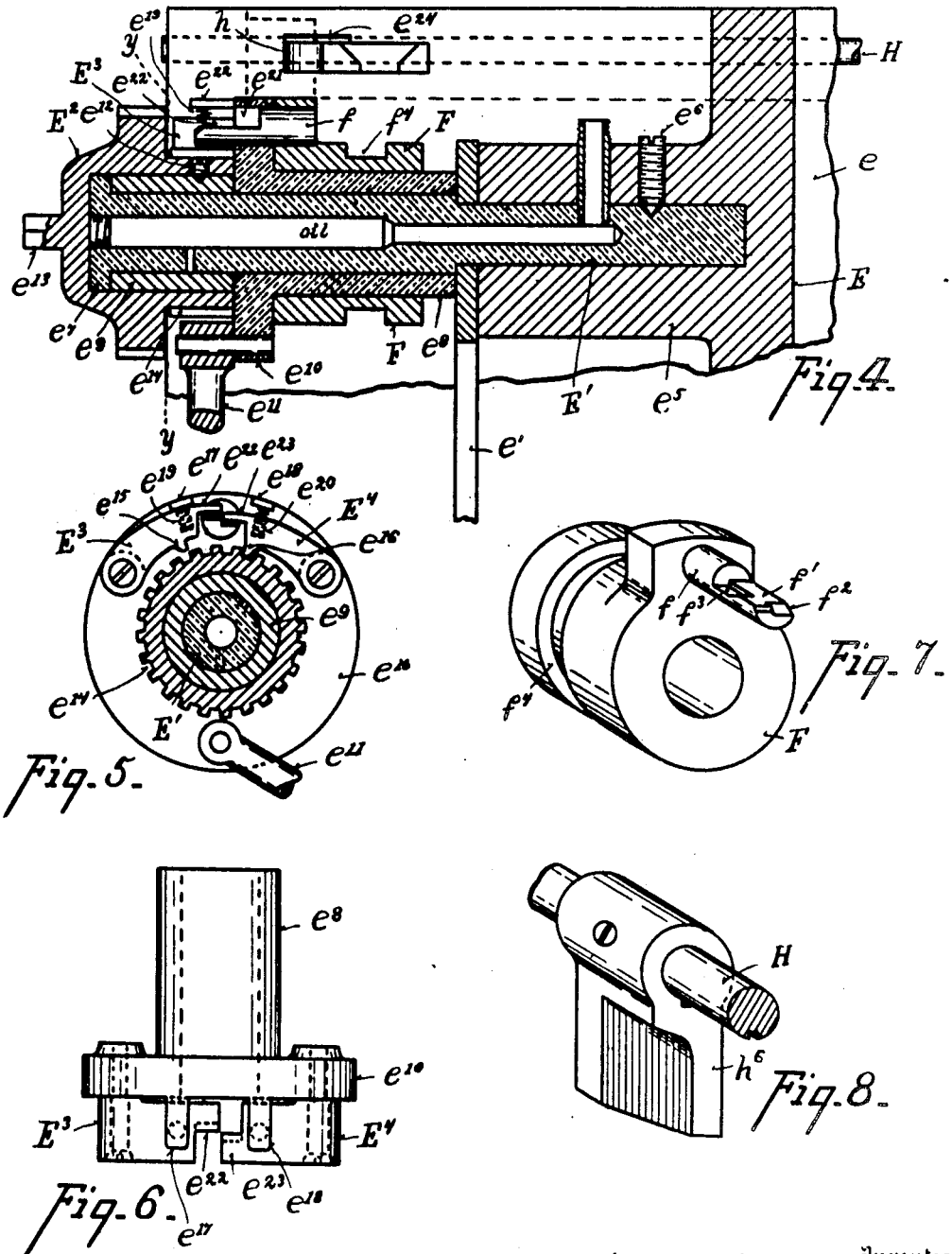

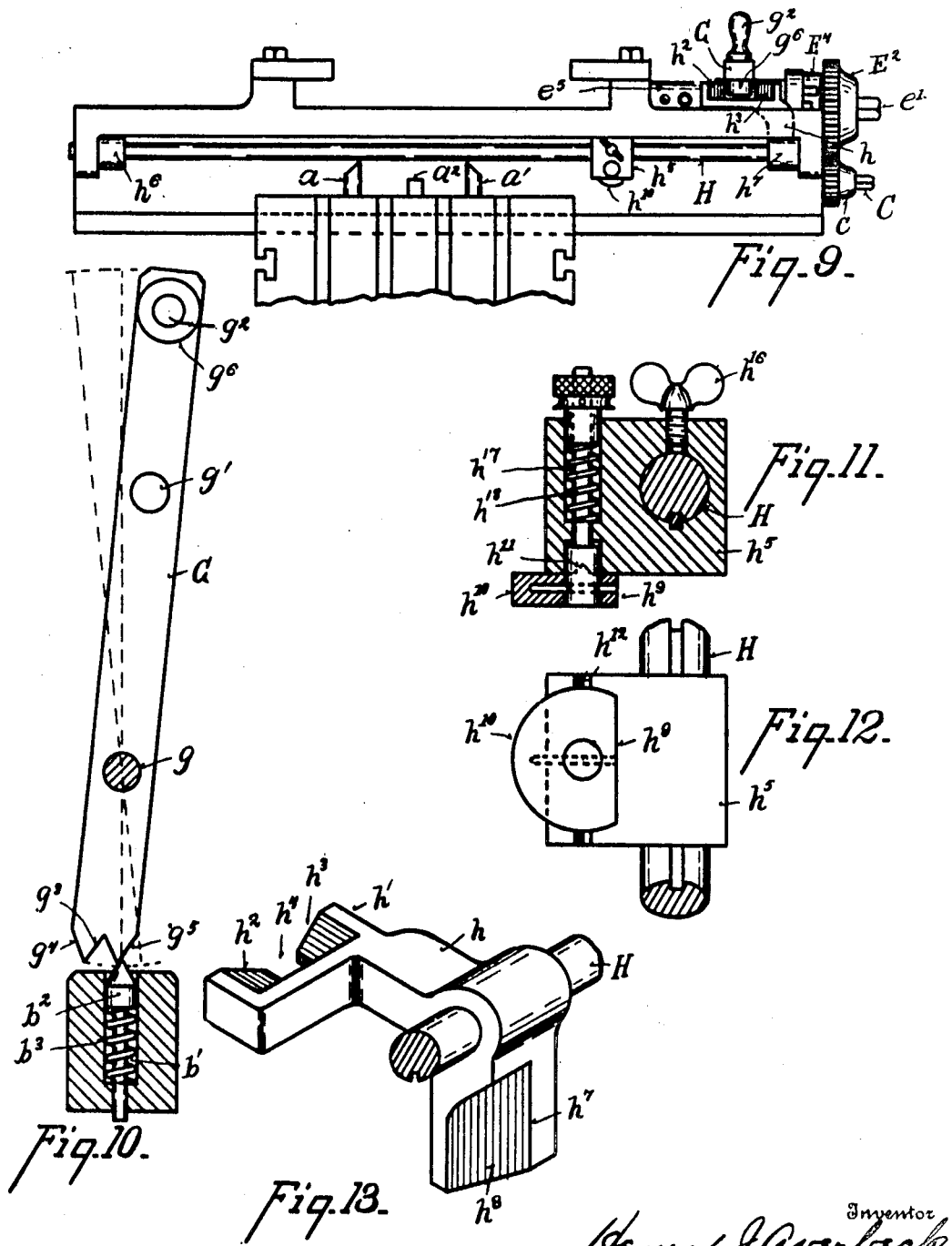

UNITED STATES PATENT OFFICE.

HENRY J. AVERBECK, OF COVINGTON, KENTUCKY.

FEED-REGULATOR.

No. 872,635.  Specification of Letters Patent.  Patented Dec. 3, 1907.

Application filed April 2, 1906. Serial No. 309,309.

*To all whom it may concern:*

Be it known that I, HENRY J. AVERBECK, a citizen of the United States o America, and resident of Covington, county of Kenton, State of Kentucky, have invented certain new and useful Improvements in Feed-Regulators, of which the following is a specification.

My invention relates to a feed regulator for cutting-machines especially adapted to the class known as shapers, and is an improvement upon the feed regulator for which United States Letters Patent No. 786,942 were granted to me.

Figure 2:
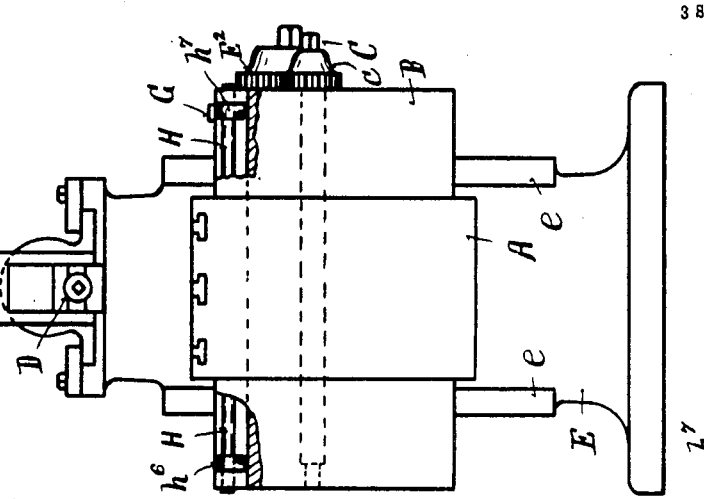
Figure 1:
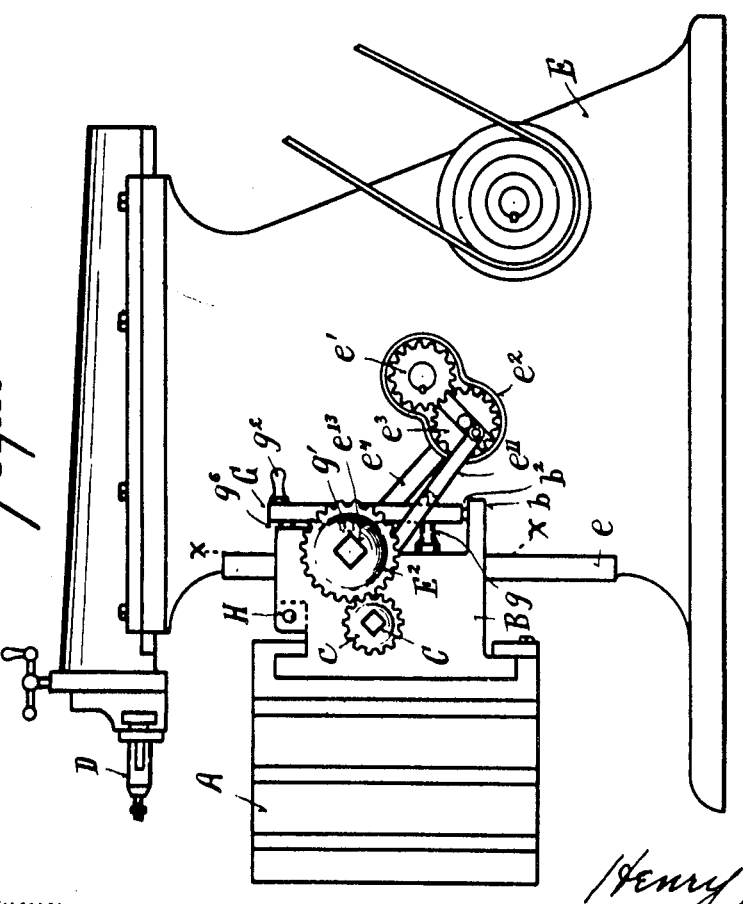
Figure 3:
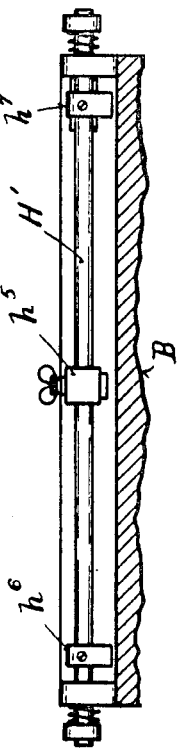

The object of my invention is to simplify the number of parts in the feed regulator referred to, to provide ready means for changing the direction of the feed and for adjustments of the table by hand. This object is attained by the means described in the specification and illustrated in the accompanying drawings, in which like parts are indicated by similar reference letters wherever they occur throughout the various views, in which, Figure 1 is a side elevation of a shaper with the feed regulating device embodying my invention. Fig. 2 is a front view of the same, the upper corners of the ways being partly cut away to expose the feed regulating shaft. Fig. 3 is a detail view of a modified form of the feed regulating shaft. Fig. 4 is a sectional view taken upon line $x$—$x$ of Fig. 1, upon an enlarged scale, showing the auxiliary stud shaft, the loose sleeve which carries the regulating pawl, the loose pinion which engages a pinion upon the feed-screw, and the sliding sleeve which regulates the position of the pawls. Fig. 5 is a detail sectional view taken upon line $y$—$y$ of Fig. 4. Fig. 6 is a detail plan view of the loose sleeve which carries the regulating pawls. Fig. 7 is a perspective view of the sliding sleeve which regulates the position of the pawls. Fig. 8 is a perspective view of the regulating feed shaft with one of the contact devices for stopping the feed when the apron has reached the limit of its travel. Fig. 9 is a detail plan view of the ways, the feed regulating shaft, the rear of the apron and the automatic feed regulator. Fig. 10 is a detail view upon an enlarged scale of the lever which actuates the sliding sleeve. Fig. 11 is a section view upon an enlarged scale of the adjustable contact device. Fig. 12 is an inverted plan view of the same. Fig. 13 is a perspective view upon an enlarged scale of the arm which controls the position of the lever.

Referring to the parts: Apron, A, is mounted to slide in horizontal ways, B, across which it is fed by a feed-screw, C, beneath the cutting tool, D, in the usual manner. The ways, B, are capable of a vertical movement upon the vertical ways, $e$, of the frame, E, and main driving shaft, $e'$ is supplied with a rotatable housing, $e^2$, a pinion, $e^3$, the link, $e^4$, connecting the housing, $e^2$, and the stud shaft, E′, as shown in Fig. 4. The shaft, $e^4$, rotates the housing, $e^2$, when the ways, B, are adjusted vertically on the ways, $e$. The parts thus far described are of ordinary construction, and need not, therefore, be more specifically described.

Stud shaft, E′, is held in a socket, $e^5$, of the frame, E, by means of a set-screw, $e^6$. Stud shaft, E′, has a flange, $e^7$, at its outer end and has between the flange, $e^7$, and the arm, $e^4$, two loose sleeves, $e^8$, and $e^9$. Loose sleeve, $e^8$, has a circular flange, $e^{10}$, upon its end, to which the arm, $e^{11}$, is pivoted, the opposite end of the arm, $e^{11}$, being pivoted to the pinion, $e^3$, so that a vibratory motion is imparted to the sleeve, $e^8$, by the link, $e^{11}$. Over the flanged end, $e^7$, of the stud shaft a pinion, E², is slipped which has an annular flange to pass over the sleeve, $e^9$, to which it is secured by means of a set-screw $e^{12}$, so that while the pinion, E², is free to rotate upon stud-shaft, E′, it is held from slipping off the end thereof by means of the sleeve, $e^9$, and the flanged end, $e^7$. Pinion, E², has upon its end a square stud, $e^{13}$, which may receive a crank handle for imparting rotation to the pinion, E², by means of hand. Pinion, E², meshes with a pinion, $c$, upon the end of the feed screw, C. When the pinion, E², is actuated, it is seen that the feed-screw, C, is rotated for feeding the apron A, upon the ways, B. The pinion, E², is rotated whenever it is coupled up to the sleeve, $e^8$.

The means of coupling the pinion, E², and the sleeve, $e^8$, are as follows: The annular sleeve of the pinion, E², has peripheral teeth, $e^{14}$, as shown in Figs. 4 and 5. The flange, $e^{10}$, on sleeve, $e^8$, has pivoted upon it reverse pawls, E³, and E⁴, which have teeth, $e^{15}$, and $e^{16}$, for engaging the teeth, $e^{14}$, the teeth, $e^{15}$, and $e^{16}$, having faces parallel to the sides of the teeth for engaging the same and the opposite faces of the teeth, $e^{15}$ and $e^{16}$, being made slanting so as to permit the disengagement of the teeth, $e^{15}$, and $e^{16}$, from the teeth, $e^{14}$. Flange, $e^{10}$, has horizontal studs, $e^{17}$, and $e^{18}$, which carry coiled springs, $e^{19}$, and $e^{20}$, which tend to hold the pawls, $E^3$ and $E^4$, downward in contact with the teeth, $e^{14}$.

To control the position of the pawls, $E^3$ and $E^4$, I have provided the following means. Mounted upon rotating sleeve, $e^8$, is a sliding sleeve, F, which carries a finger, $f$, which projects through a perforation, $e^{21}$, in the flange, $e^{10}$. Finger, F, has a face, $f'$, and beveled faces, $f^2$, and $f^3$, which project under fingers, $e^{22}$, and $e^{23}$, of pawls, $E^3$, and $E^4$. When the fingers, $e^{22}$, $e^{23}$ rest upon the face, $f'$, of the finger, F, the pawls, $E^3$, and $E^4$, are held in a position such that the teeth, $e^{15}$, and $e^{16}$, are held out of engagement with the teeth, $e^{14}$. When the face, $f^2$, is underneath the finger, $e^{23}$, the tooth, $e^{16}$, engages the teeth, $e^{14}$, as shown in Fig. 5, at which time the finger, $e^{22}$, would rest upon the face, $f'$, and be held out of contact with the teeth, $e^{14}$. When the sleeve, F, is brought to the position in which the finger, $e^{22}$, contacts the face, $f^3$, of the finger, F, the tooth, $e^{15}$, engages the teeth, $e^{14}$, and the finger, $e^{23}$, would rest upon the face, $f'$, so that the tooth, $e^{16}$, disengages the teeth, $e^{14}$. When the sleeve, F, stands in an intermediate position, so that both the fingers, $e^{22}$, and $e^{23}$, rest upon the face, $f'$, neither of the teeth, $e^{15}$, nor $e^{16}$, engage the teeth, $e^{14}$. Which of the three positions, viz., the one to the extreme of the left, (as shown in Fig. 4) or the one to the extreme right, or the intermediate position between the two, sleeve F, occupies is regulated by the lever, G. Lever, G, is pivoted upon a stud, $g$, secured to the ways, B, as shown in Fig. 1. It carries a stud, $g'$, which projects into annular groove, $f^4$, in sleeve, F, and has at its upper end a handle, $g^2$. The lower end of the lever has a central notch, $g^3$, and beveled faces, $g^4$ and $g^5$, upon each side of the central notch. Beneath the lever, G, ways, B, have a projection, $b$, having a socket, $b'$, in which is seated a pointed pin, $b^2$, which is normally pressed upward by a spring, $b^3$, to engage the lower faces of the lever, G, as shown in Fig. 10. When the lever, G, is moved to its central position, pin, $b^2$, fits into notch, $g^3$, to hold the lever in that position, and when the lever is moved either to its left or right position, pin, $b^2$, engages either face, $g^4$, or $g^5$, to hold the lever in either of its positions to prevent accidental movement of the same.

When the lever, G, occupies its left hand position, (as shown in Fig. 10) it is seen that the pawl, $E^3$, will engage the teeth, $e^{14}$, so that the carriage will be fed towards the left, (looking at Fig. 2,) and when the lever, G, is thrown to its extreme right position, the pawl, $E^4$, will engage the teeth, $e^{14}$, so that the apron will be fed towards the right, and when the lever, G, occupies its central position, the sleeve, F, will be held in its central position and neither one of the pawls engage the teeth, $e^{14}$, so that the connection between the feed-screw, C, and the sleeve, $e^8$, is broken and the apron will be stationary.

Lever, G, may be moved to any one of its three positions, either by hand or may be moved automatically by the feed regulating shaft, H, when the apron has reached a certain point of its travel.

Feed regulating shaft, H, in the form shown in Fig. 9, is mounted rotatably in the ways, B, and carries an arm, $h$, which projects through a hole, $e^{24}$, in the vertical ways, $e$, and has upon its end a block, $h'$, provided with oppositely beveled faces, $h^2$, and $h^3$, between which is an opening, $h^4$. Block, $h'$, stands with the faces, $h^2$, and $h^3$, in the path of a cylindrical finger, $g^6$, upon the lever, G. When the arm, $h$, is in its normal position, and the lever, G, is thrown either to its right hand or its left hand position, pin, $g^6$, rests upon either face, $h^2$, or $h^3$. When the feed regulating shaft, H, is rotated to carry block, $h'$, upward, the face, $h^2$, or $h^3$, pushes upon the pin, $g^6$, and carries the lever to its central position, in which the pin, $g^6$, fits into the opening, $h^4$. The rotation of the regulating shaft, H, may be occasioned by projections on the apron striking either the adjustable contact device, $h^5$, or the fixed contact devices, $h^6$, and $h^7$, at the end of the feed regulating shaft, H. The fixed contact device, $h^7$, as shown in Fig. 13, is formed integral with the arm, $h$. Each of the fixed contact devices has beveled faces, such as $h^8$, in Fig. 13, which may be contacted by pins, $a$, $a'$, upon the apron.

The adjustable contact device consists of a block splined upon shaft, H, so as to be moved thereon to the position desired and carrying a set-screw, $h^{16}$, for holding it in that position. Block, $h^5$, has a perforation in which is seated a vertical pin, $h^{17}$, which is held normally upward by a spring, $h^{18}$. To the lower end of the pin, $h^{17}$, is secured a disk in the form of a circle with a segment cut off of one side, forming a flat face, $h^9$, and a round face, $h^{10}$. The disk has a V-shaped projection, $h^{11}$, on its upper face which fits into a V-shaped groove, $h^{12}$, in the underside of the block, $h^5$ to hold either the round face, $h^{10}$, in the path of a pin, $a^2$, upon the apron, as shown in Fig. 9, or to present the flat face, $h^9$, so that the pin, $a^2$, will pass the contact pivot, $h^5$, without hitting it.

To change the position of the faces, $h^9$ or $h^{10}$, it is necessary only to press downward upon the pin, $h^{17}$, and rotate the pin. When it is desired to stop the apron automatically at any predetermined point, the movable contact device, $h^5$, is adjusted upon the feed regulating shaft, H. The arms, a, a', are located upon the apron below the plane of the block, $h^5$, so that they do not contact the movable contact device. When the arm, $a^2$, which projects from the apron in the plane of the movable contact device strikes the face, $h^{10}$, it rotates the shaft, H, carries the arm, h, upward and causes the lever, G, to be carried to its central position, in which the pin, $g^6$, lies in the opening, $h^4$, between the faces, $h^2$, and $h^3$. In this position, as aforedescribed, neither of the pawls, $E^3$, nor $E^4$, contact the teeth, $e^{14}$.

Instead of having the regulating shaft rotated by the contact of the apron, it is obvious that it could be reciprocated as shown in Fig. 3, in which the regulating shaft, H', is shown as mounted in ways, B, so as to be capable of reciprocation therein. In this modification, when the stud, $a^2$, strikes the adjustable block, $h^5$, it reciprocates the rod, H', which will cause the face, $h^2$, or $h^3$, to carry the lever, G, to its central position. The same is true when the studs, a, or a', strike the fixed contact, $h^6$, or $h^7$.

When the lever, G, is in its central position, so that the pinion, $E^2$, is disconnected from the sleeve, $e^8$, it is seen that the apron, A, may be fed along its ways by hand, either by engaging the square end of the feed-screw, C, by a wrench, or by engaging the squared end of the pinion, $E^2$, with the wrench. The feed shaft would be engaged directly when it was desired to move the apron simply for fine adjustment, and the pinion, $E^2$, would be engaged by the wrench when it was desired to give a more rapid movement to the apron. It is apparent that since the lever, G, is standing in its central position, the operator need not pay any attention to the adjustable block, $h^5$, upon the feed regulating shaft, for even though it should be struck by the projection, $a^2$, on the apron, it would simply rotate the feed regulating shaft, H, without moving the sleeve, F, since said sleeve is in its central position.

What I claim is:

1. The combination of ways, an apron mounted reciprocably upon the ways, a feed-screw for reciprocating the apron, an auxiliary shaft mounted adjacent to the feed-screw, a pinion mounted loosely upon the auxiliary shaft and meshing with the feed-screw, a sleeve mounted rotatably upon the auxiliary shaft, a driving shaft, means for coupling the sleeve to the driving shaft, two pawls mounted upon the sleeve and adapted to engage the pinion, one of said pawls moving the pinion in one direction and the other moving it in the opposite direction and a shifting mechanism mounted adjacent to the sleeve and engaging the pawls so that when moved in one direction it carries one of the pawls into engagement and the other one out of engagement with the pinion and when moved in the opposite direction it carries the first of said pawls out of engagement and carries the second into engagement with the pinion, and when in an intermediate position holds both pawls out of engagement with the pinion.

2. A shifting mechanism for making and breaking the connection between the feed-screw and the driving shaft, consisting of an auxiliary shaft, a pinion mounted upon the shaft adapted to engage the feed-screw, a loose sleeve mounted upon the auxiliary shaft, means for connecting it to the driving shaft, pawls pivoted upon the loose sleeve and facing in opposite directions, a sliding sleeve mounted upon the loose sleeve and a finger secured to the sliding sleeve projecting beneath the pawls and having its ends beveled so that when the sliding sleeve is at either limit of its travel, one or the other of the pawls is in contact with the pinion and when the sleeve is in its intermediate position both pawls are held out of contact with the pinion by the finger.

3. The combination of ways, an apron mounted reciprocably upon the ways, a feed-screw for reciprocating the apron, an auxiliary shaft mounted adjacent to the feed-screw, a pinion mounted loosely upon the auxiliary shaft and meshing with the feed-screw, a sleeve mounted rotatably upon the auxiliary shaft, means for coupling the sleeve to the driving shaft, two pawls mounted upon the sleeve and adapted to engage the pinion, one of said pawls moving the pinion in one direction and the other moving it in the opposite direction, a shifting mechanism mounted adjacent to the sleeve and engaging the pawls so that when moved in one direction it carries one of the pawls into engagement and the other one out of engagement with the pinion and when moved in the opposite direction it carries the first of said pawls out of engagement and carries the second into engagement with the pinion, and when in an intermediate position holds both pawls out of engagement with the pinion, a lever for engaging the shifting mechanism and an automatic means for holding it in a central or in a position to one or the other side of its central position.

4. The combination of ways, an apron mounted reciprocably upon the ways, a feed-screw for reciprocating the apron upon the ways, a driving shaft, a means for connecting the feed-screw and the driving shaft, a feed regulating shaft mounted adjacent to the apron, a movable contact device mounted upon the feed regulating shaft and adapted to be contacted by the apron to move the feed regulating shaft, and means for connecting the feed regulating shaft and the connecting means between the driving shaft and a feed-screw whereby when the feed-regulating shaft is moved it operates the connecting means to break the connection between the feed-screw and the driving shaft.

5. The combination of ways, an apron reciprocating on the ways, a feed-screw for feeding the apron, an auxiliary shaft, a pinion mounted on the auxiliary shaft and engaging the feed-screw, a sleeve mounted on the auxiliary shaft, reverse pawls pivoted upon the sleeve and adapted to engage the pinion to move it in opposite directions, a shifting mechanism mounted adjacent to the sleeve and carrying a finger which in the extremes of the travel of the shifting mechanism carries one pawl into engagement and the other out of engagement with the pinion, a lever for reciprocating the shifting mechanism, a feed regulating shaft mounted in the ways, an arm mounted on the regulating shaft and engaging the lever so that when the regulating shaft is carried from its normal position it moves the lever to its central position to carry the pawls out of engagement with the pinion.

6. The combination of ways, an apron mounted on the ways, a feed screw for reciprocating the apron on the ways, a pinion upon the feed screw, an auxiliary shaft mounted in the ways, a pinion mounted loosely upon the end of the auxiliary shaft meshing with the pinion on the feed screw and adapted to be engaged by a wrench, a sleeve mounted upon the auxiliary shaft, devices carried by sleeve for engaging the loose pinion, a driving shaft, and a shifting mechanism for moving the sleeve for connecting and disconnecting the loose pinion with the driving shaft.

HENRY J. AVERBECK.

Witnesses:
WALTER F. MURRAY,
AGNES McCORMACK.